US010376965B2

(12) United States Patent
Hengsberger et al.

(10) Patent No.: US 10,376,965 B2
(45) Date of Patent: Aug. 13, 2019

(54) DRILLING CHUCK (71) Applicant: Roehm GmbH, Sontheim/Brenz (DE)

(72) Inventors: Patrick Hengsberger, Sontheim/Brenz (DE); Hans Baumann, Sontheim-Brenz (DE); Peter Schenk, Niederstotzingen (DE)

(73) Assignee: Roehm GmbH, Sontheim/Brenz (DE)

( * ) Notice: Subject to any disclaimer, the term of this patent is extended or adjusted under 35 U.S.C. 154(b) by 35 days.

(21) Appl. No.: 15/609,069

(22) Filed: May 31, 2017

(65) Prior Publication Data
US 2017/0348775 A1 Dec. 7, 2017

(30) Foreign Application Priority Data

Jun. 1, 2016 (DE) .......................... 10 2016 110 111

(51) Int. Cl.
*B23B 31/12* (2006.01)
*B25D 17/08* (2006.01)
*B25B 21/02* (2006.01)

(52) U.S. Cl.
CPC ........ *B23B 31/123* (2013.01); *B23B 31/1238* (2013.01); *B25D 17/084* (2013.01); *B25B 21/02* (2013.01); *B25D 2250/301* (2013.01)

(58) Field of Classification Search
CPC .............. B23B 31/123; B23B 31/1238; B23B 2231/38; B25B 21/02; B25D 17/084; B25D 2250/301; Y10T 279/32; Y10T 279/17632

USPC .......................................................... 279/140
See application file for complete search history.

(56) References Cited

U.S. PATENT DOCUMENTS 8,950,508 B2  2/2015  Hoop et al.
2015/0115550 A1  4/2015  Schenk et al.

FOREIGN PATENT DOCUMENTS

DE  10 2010 062 014 B3  5/2012
DE  10 2013 111 731 A1  4/2015

*Primary Examiner* — Sunil K Singh
*Assistant Examiner* — Paul M Janeski
(74) *Attorney, Agent, or Firm* — Muncy, Geissler, Olds & Lowe, P.C.

(57) ABSTRACT

A drilling chuck for operation on an impact drilling spindle, which can be subjected to tangential loading, with a chuck body, which is connected or connectable to the impact drilling spindle in which jaw guides are formed, which run inclined to the chuck axis in which jaw guides and clamping jaws are guided, which can be adjusted by a threaded ring, with a clamping sleeve, which can be coupled in a torque-transmitting manner to the threaded ring, and with a locking device, which is adjustable between a release configuration, which enables a relative rotation of the threaded ring with respect to the chuck body and a locking configuration, which obstructs or prevents this relative rotation. The locking device is formed from a locking sleeve, which is mounted essentially rotationally fixed but axially displaceable with respect to the chuck body, which comprises at least one locking member.

11 Claims, 6 Drawing Sheets

DRILLING CHUCK

This nonprovisional application claims priority under 35 U.S.C. § 119(a) to German Patent Application No. 10 2016 110 111.7, which was filed in Germany on Jun. 1, 2016, and which is herein incorporated by reference.

BACKGROUND OF THE INVENTION

Field of the Invention

The invention relates to a drilling chuck for operation on an impact drilling spindle that can be subjected to tangential loading, with a chuck body connected or connectable to the impact drilling spindle, in which jaw guides are formed, which run in an inclined manner towards the chuck axis, in which clamping jaws are guided which are adjustable by means of a threaded ring, with a clamping sleeve that can be coupled with the threaded ring in a torque-transmitting manner, and with a locking device which is adjustable between a release configuration, which enables a relative rotation of the threaded ring with respect to the chuck body, and a locking configuration, which obstructs or prevents this relative rotation.

Description of the Background Art

A drilling chuck of the type mentioned in the introduction is to be taken from DE 10 2013 111 731 A1, which corresponds to US2015/0115550, which is incorporated herein by reference. The rounded jaw drilling chuck shown therein has an axially operable locking device, which is to obstruct or prevent a relative rotation of the threaded ring relative to the chuck body. This is to ensure that the clamping jaws are neither loosened nor additionally tensioned during operation of the drilling device.

A hand-held power tool is shown in DE 10 2010 062 014 B3, which corresponds to U.S. Pat. No. 8,950,508, and which comprises a tangential impact mechanism. A tangential impact mechanism usually has an impact drilling spindle, to which an anvil is assigned. This anvil is connected non-rotatably with the impact drilling spindle. Furthermore, the machine drive comprises a hammer which transmits rotating and partially tangentially percussive movements over the anvil to the impact drilling spindle. During this operation, there is a temporarily strongly increased torque on the drilling chuck body, which is coupled with the impact drilling spindle. Due to these increased torques, locking devices of drilling chucks are threatened to be overridden.

Thus, in conventional drilling chucks, it has been shown that in impact drilling operations or impact wrench operations, locking devices could transition from the locking configuration into the release configuration, which can lead to a loosening of the tool on the one hand, or to an extreme tensioning of the drilling chuck on the other hand.

SUMMARY OF THE INVENTION

It is therefore an object of the present invention to further develop a drilling chuck such that it also reliably operates when a tangential impact mechanism is used.

According to an exemplary embodiment of the invention, the locking device is formed from an essentially rotationally fixed locking sleeve, but which is mounted axially displaceable with respect to the chuck body. The locking sleeve comprises at least one locking member, wherein the threaded ring or a part connected therewith is assigned at least one locking recess for receiving the at least one locking member. Furthermore, the at least one locking member is adjustable by means of a clamping sleeve, which is mounted axially displaceable with respect to the chuck body, between a position corresponding to the locking configuration, engaged in the at least one locking recess, and a position corresponding to the release configuration, disengaged from the at least one locking recess. This embodiment has the advantage that the drilling chuck can also be used on a drilling machine which has a tangential impact mechanism. During operation of the drilling machine with the tangential impact mechanism, it is ensured that the drilling chuck according to the invention is not inadvertently moved from the locking configuration into the release configuration.

In this connection, it has proven to be advantageous if the locking device is configured in such a way that it stops the relative rotation that occurs in the locking configuration both in the direction of rotation corresponding to the release of the drilling chuck as well as in the direction of rotation corresponding to the retensioning of the drilling chuck. In drilling chucks known from the prior art, the locking device is designed in such a way that it permits retensioning of the drilling tool. In the case of known drilling chucks, therefore, the loss of clamping force resulting from the rotating clamping jaws and the centrifugal forces acting on them is to be compensated by the retensioning. This retensioning is prevented in the present invention, since the torques are so high when used on a tangentially loaded impact drilling spindle that the drilling chuck would become too tight and the tool employed could no longer be loosened.

In this case, it is advantageous if the at least one locking member is positively inserted into the at least one locking recess in the engaged position.

In order to form a reinforced locking device, it has been found to be advantageous if the locking sleeve has a locking ring with a plurality of locking members, and if the threaded ring is assigned a receptacle ring with a plurality of locking recesses. Preferably, the number of locking members corresponds to the number of locking recesses.

In order to facilitate operation of the locking device, it has been proven to be useful that the locking sleeve has a support section and that the clamping sleeve comprises a support shoulder for acting on the support section in at least the locking configuration. It is possible that the clamping sleeve is also supported by the locking sleeve in the release configuration. By means of an axial displacement of the clamping sleeve, an axial displacement of the locking sleeve is also carried out. Alternately, a driving groove is formed on the clamping sleeve, in which the support section of the locking sleeve is rotatably accommodated with respect to the clamping sleeve.

Furthermore, the support section can be formed on the at least one locking member. This way, the drilling chuck and in particular the locking device can be formed to be very compact.

It is also advantageous if the locking sleeve comprises a guide portion having a non-circular cross-section, which is guided on a non-circular chuck body section of the chuck body corresponding thereto. This way, the locking sleeve can be reliably moved between the engaged and the disengaged position along the chuck body. Preferably, the cross-section of the chuck body is formed as a hexagon in the area of the locking sleeve, wherein another number of angles is also possible. It is merely important that the locking sleeve is non-rotatably mounted with respect to the chuck body.

In order to design the axial length of the chuck body as short as possible, it has been proven to be advantageous if the locking sleeve comprises passages for the clamping jaws.

Furthermore, it has proven to be advantageous if the locking sleeve is acted upon by a restoring spring. As a result, the locking sleeve is always pressed in the direction of the engaged position by the restoring spring. In other words, the drilling chuck has an urge to move into the locking configuration. If the drilling chuck is to be moved to the release configuration, the user must actively adjust the clamping sleeve axially against the spring force of the restoring spring, in order to push the locking members from the locking recesses. Should the at least one locking member not align with the associated locking recess when the clamping sleeve is released, then during operation of the drilling chuck, the locking member is turned with respect to the locking recess by means of a tangential impact mechanism until they are once again aligned with each other. The restoring spring thereby automatically presses the switching member back into the engaged position. It is thus ensured that the drilling chuck automatically moves from the released position into the locking position, even if the locking position has not been actively set by the user.

The restoring spring can be supported on an annular collar of the chuck body or on a sleeve part which is axially fixed with respect to the chuck body.

In order to facilitate mounting of the drilling chuck, it has also proven advantageous if the threaded ring is formed in multiple parts from a driver sleeve and a clamping ring (actual threaded ring), which is in engagement with the clamping jaws. The driver sleeve is non-rotatably and axially fixed with respect to the clamping ring, which is why those skilled in the art of the respective field recognize that both parts can also be formed as a single, one-piece part, i.e., as a single, complex threaded ring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 6:
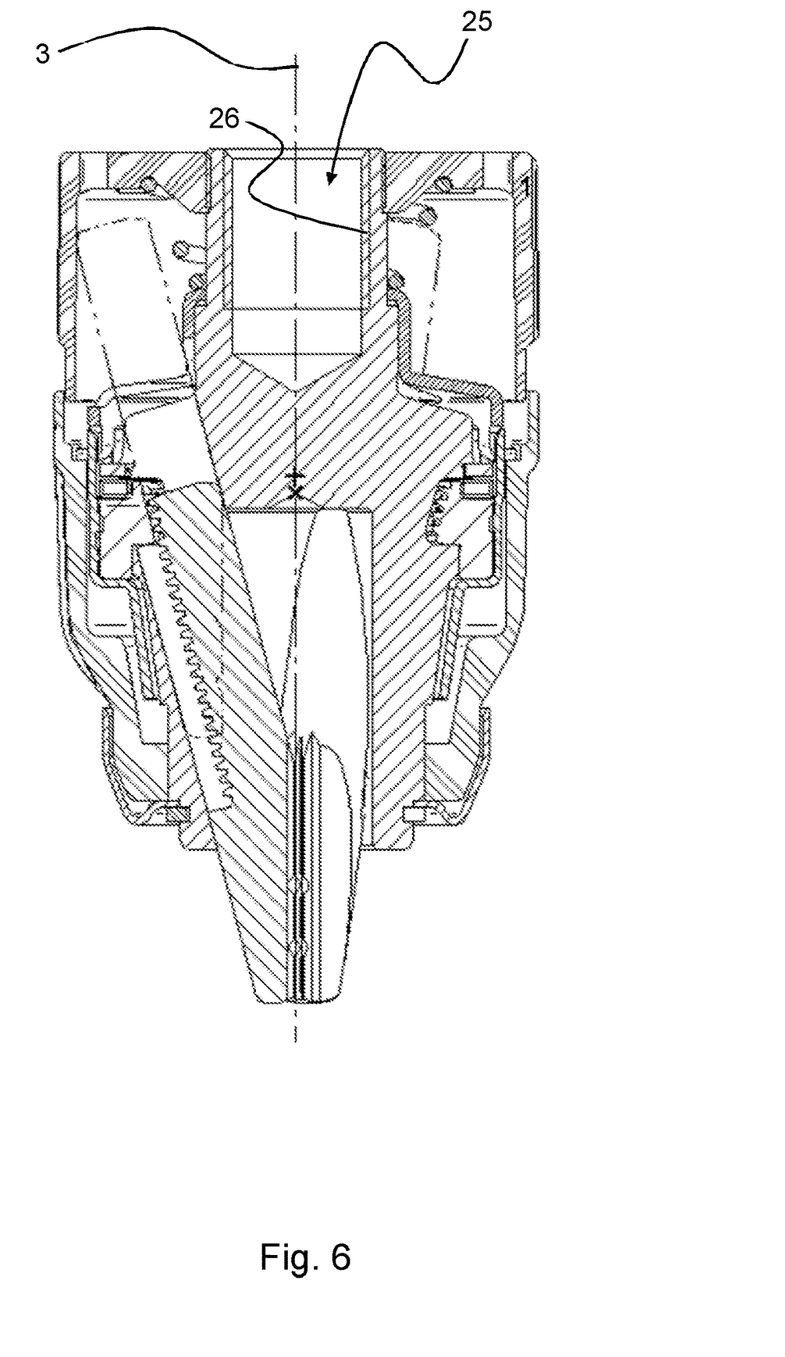
FIG. 6 illustrates an embodiment of the drilling chuck according to the invention.
Figure 7:
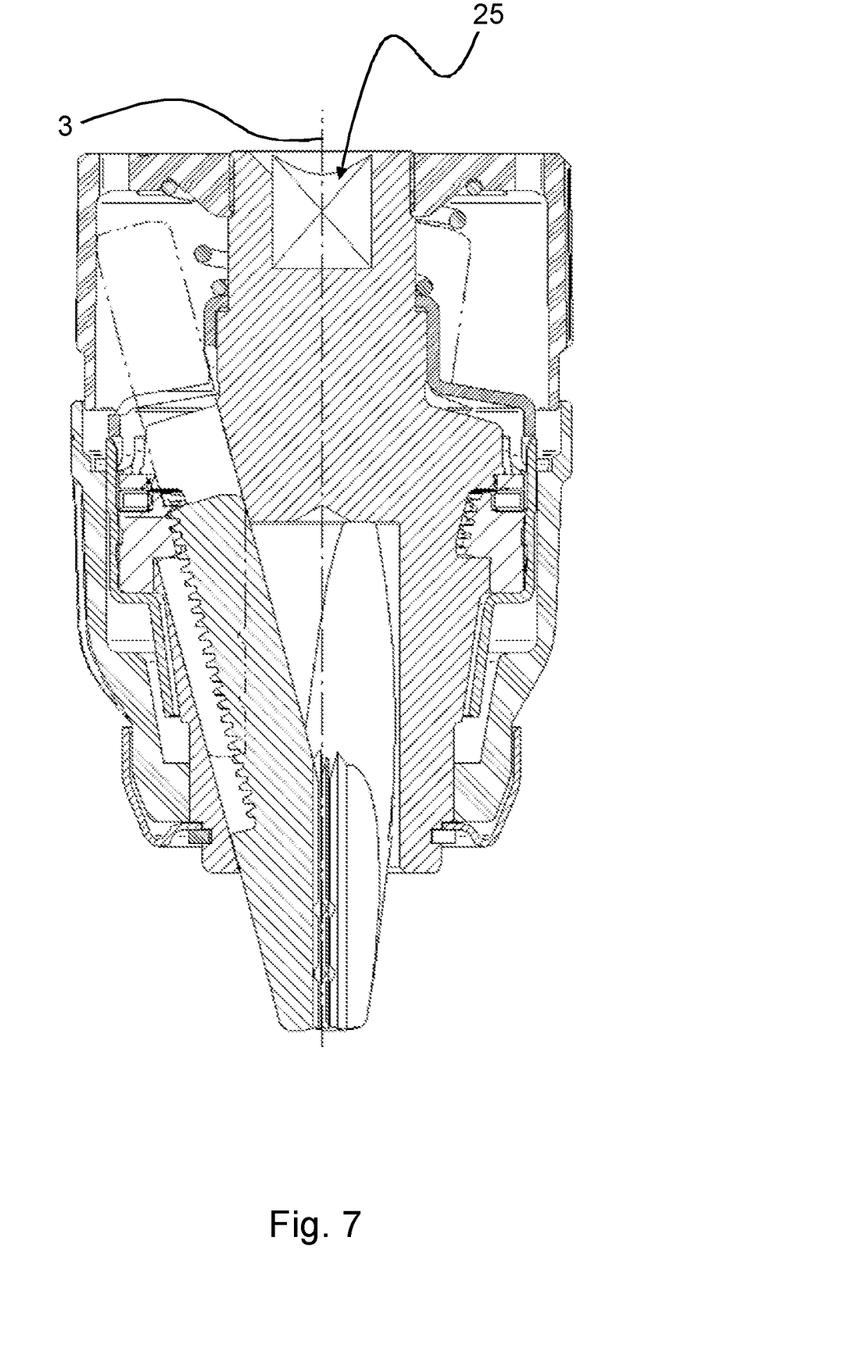
FIG. 7 illustrates an embodiment of the drilling chuck according to the invention.

In the figures, a drilling chuck with a chuck body 2 is shown, which is provided for operation on an impact drilling spindle 1, which can be subjected to tangential loading. In the embodiment according to FIGS. 1 to 5, the impact drilling spindle 1 is fixedly connected to the chuck body 2 and formed in one piece with it. The impact drilling spindle 1 has a connection 23 for an anvil of a tangential impact mechanism, which in the present case is formed by two flattenings 24 which prescribe the rotationally fixed position of the anvil. In the embodiments according to FIGS. 6 and 7, spindle mounts 25 are alternatively formed in the chuck body 2, to which a corresponding impact drilling spindle 1 can be connected. In the embodiment according to FIG. 6, the spindle mount 25 is formed with a mating thread 26, and in the embodiment according to FIG. 7, the spindle mount 25 is formed with a non-circular cross-section for receiving a spindle pin.

In all drilling chuck embodiments, jaw guides 4 are formed, which run inclined to the chuck axis 3, in which clamping jaws 6 are guided, which have a toothing 27, which is connected with a clamping thread 28 of the threaded ring 5. In the exemplary embodiments shown, the threaded ring 5 is formed in multiple parts from a driver sleeve 21 and a clamping ring 22 (actual threaded ring), which is in engagement with the clamping jaws 6. The clamping jaws 6 form a tool holder between them. A turning of the threaded ring 5 causes an opening or a closing of the clamping jaws 6, in order to tension or release a drilling tool or screwing tool arranged between them. In order to be able to turn the threaded ring 5 from the outside, a clamping sleeve 11, which can be coupled in a torque-transmitting manner, is provided, which is preferably actuated manually by a user.

The drilling chucks shown by way of example also have a locking device 7, which is adjustable between a release configuration or clamping configuration that allows a relative rotation of the threaded ring 5 with respect to the chuck body 2, and a locking configuration that obstructs or prevents this relative rotation of the threaded ring 5 with respect to the chuck body 2.

Figure 5:
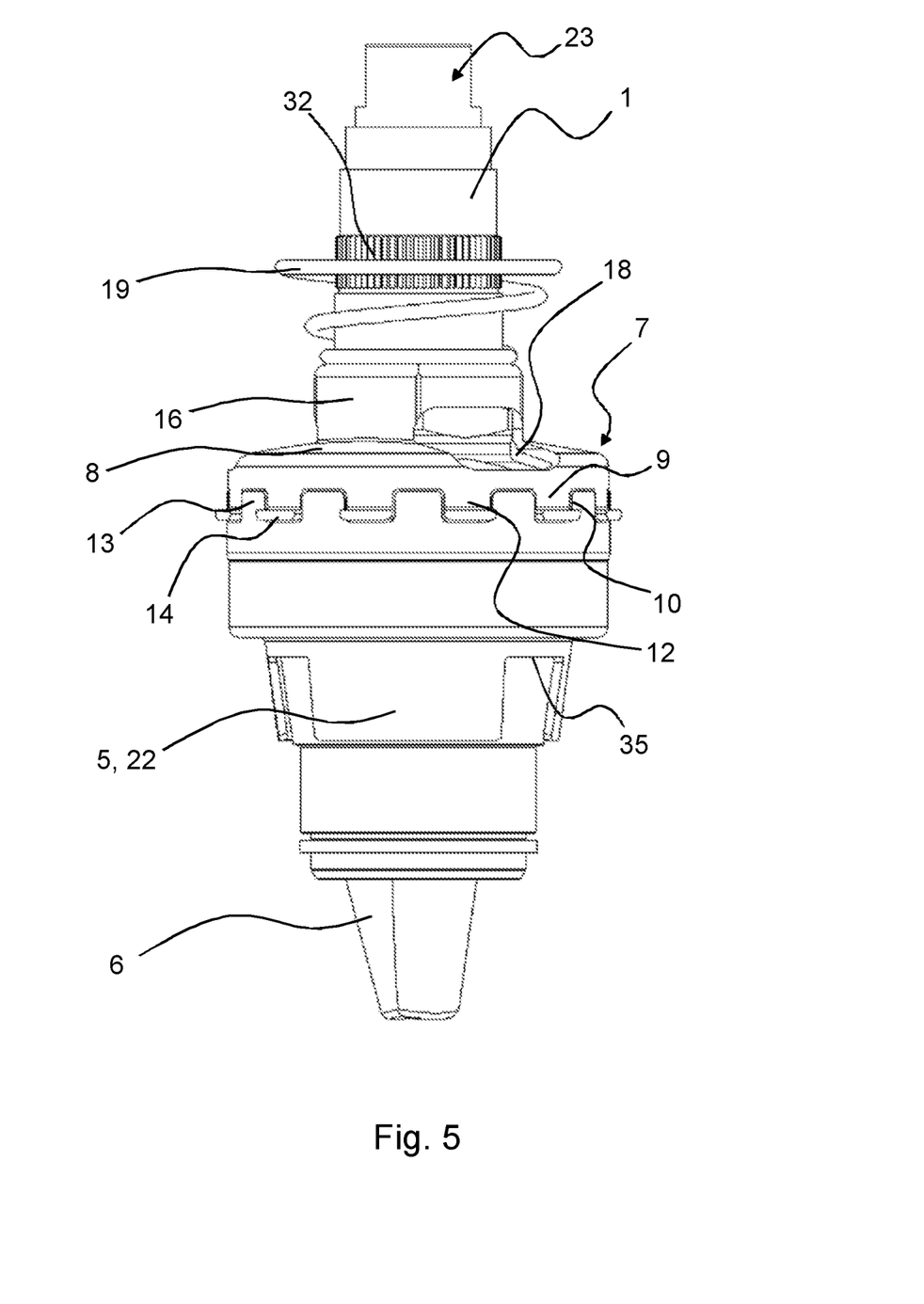
FIG. 5 is a side view of the drilling chuck according to FIG. 1, shown without clamping sleeve and without sleeve part.

The locking device 7 comprises a locking sleeve 8, which is arranged essentially non-rotatable with respect to the chuck body 2, but which is mounted axially displaceable with respect to the chuck body 2. The locking sleeve 8 has at least one locking member 9, wherein in the exemplary embodiments shown, the locking sleeve 8 comprises a locking ring 12 with a plurality of locking members 9 (FIG. 5). Furthermore, the locking device 7 comprises at least one locking recess 10 assigned to the threaded ring 5, in the present case, assigned to its driver sleeve 21, for accommodating the at least one locking member 9. In the illustrated embodiments, the driver sleeve 21 has a receptacle ring 13 with a plurality of locking recesses 10. The number of locking recesses 10 corresponds to the number of locking members 9.

Figure 1:
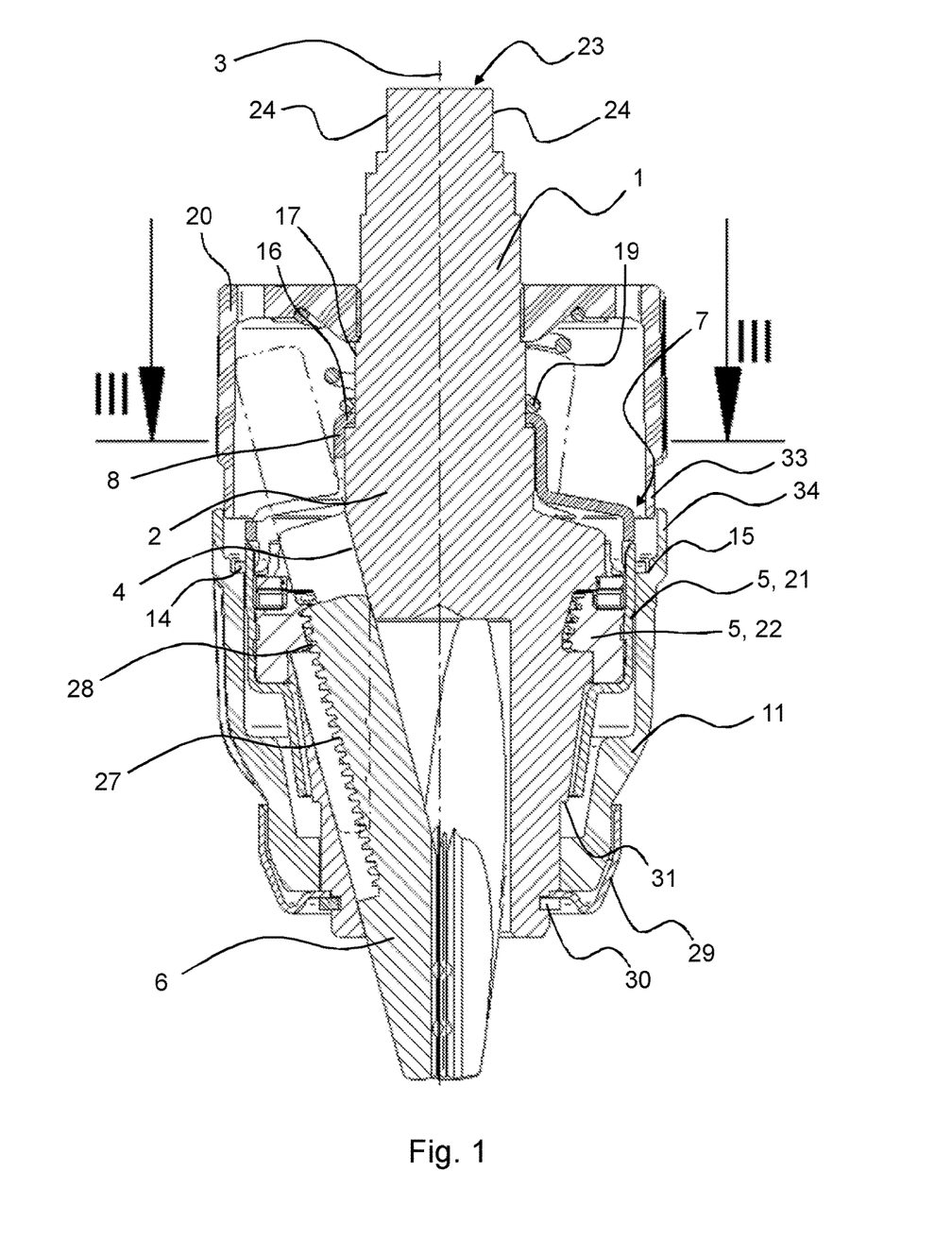
FIG. 1 is a longitudinal section of a drilling chuck according to the invention, in the locking configuration.
Figure 2:
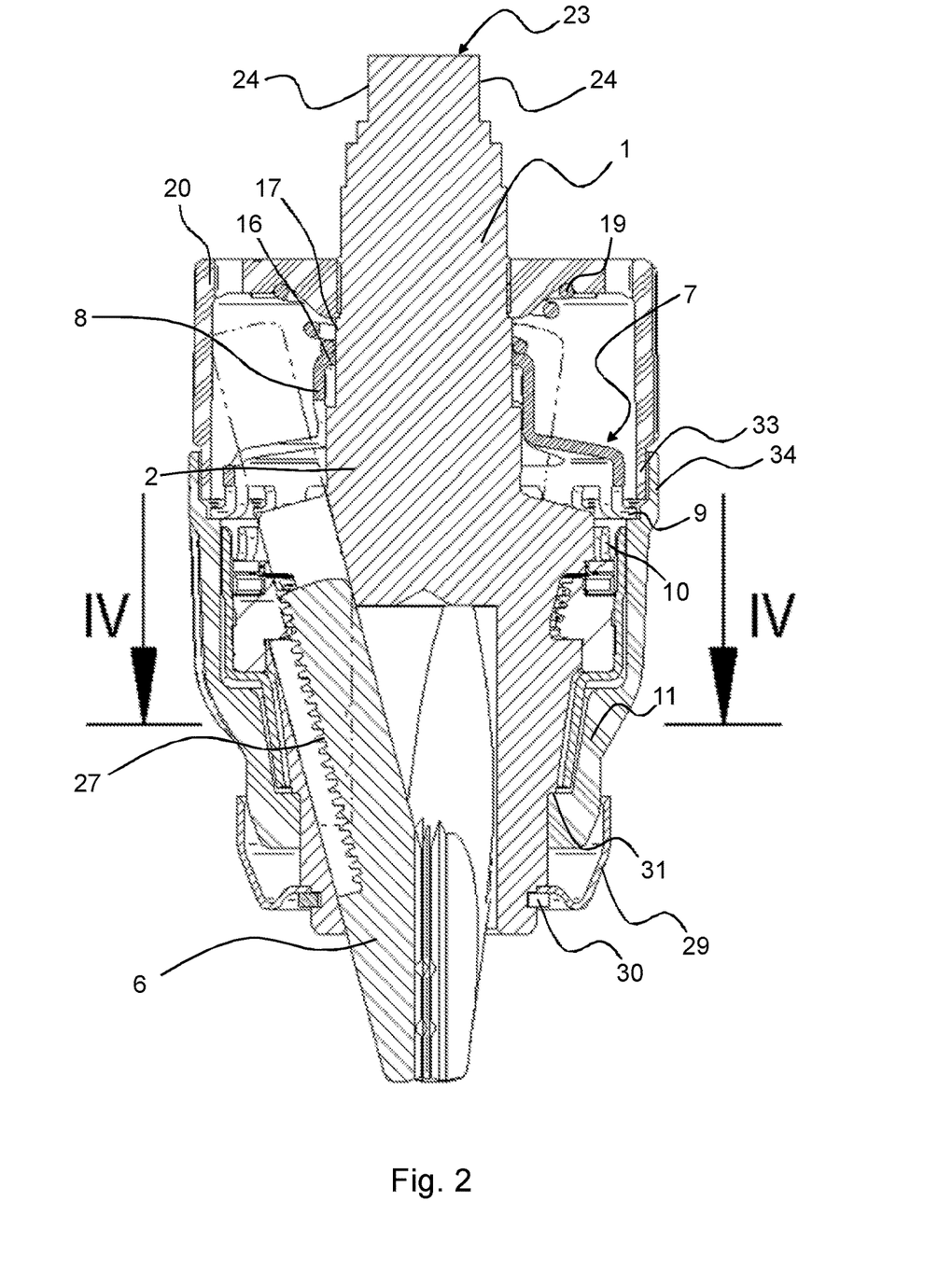
FIG. 2 is a longitudinal section of the drilling chuck from FIG. 1, in the release configuration.

As can be seen from a comparison of FIGS. 1 and 2, the clamping sleeve 11 is mounted axially displaceable with respect to the chuck body 2. The clamping sleeve 11 is supported axially forward, that is to say in the direction of the side of the drilling chuck facing away from the impact drilling spindle 1, by means of a preferably rotatably mounted protective cap 29. For its part, the protective cap 29 is fixed on the chuck body 2 by a snap ring 30. The movement of the clamping sleeve 11 is preferably limited backwards, i.e., in the direction of the side of the drilling chuck facing the impact drilling spindle 1, by a stop 31 on the chuck body 2. However, it is also possible that the movement of the clamping sleeve 11 is restricted by the threaded ring 5.

On the side of the clamping sleeve 11 facing the impact drilling spindle 1, a support shoulder 15 is formed, which in the exemplary embodiments shown is formed as an internal annular collar. The latter can be easily produced by a turning process of the clamping sleeve 11. A support section 14 of the locking sleeve 8 is supported on this support shoulder 15 so that the locking sleeve 8 is entrained during the axial displacement of the clamping sleeve 11. In order to be able to entrain the locking sleeve 8 axially forwards and axially rearwards, it is alternatively also possible that the support shoulder 15 be designed as an annular groove formed in the clamping sleeve 11. By axially displacing the clamping sleeve 11, the locking member 9 assigned to the locking sleeve 8 can be moved between a position corresponding to the locking configuration that is engaged in the at least one locking recess 10, and a position corresponding to the release configuration that is disengaged from the at least one locking recess 10.

In the present case, the support section 14 or the support sections 14 of the locking sleeve 8 are formed on each of the locking members 9, wherein the support section 14 is formed as a collar radially projecting with respect to the chuck axis 3. In the clamping or release configuration, the support sections 14 or the collars can slide at least in part along the support shoulder 15 of the clamping sleeve 11 in order to enable a relative rotation of the threaded ring 5 with respect to the chuck body 2.

The locking sleeve 8 is acted upon axially rearward by a restoring spring 19 so that a restoring force of this restoring spring 19 always effects the locking sleeve 8 in the direction of the clamping jaws 6. In other words, with its locking members 9, the locking ring 12 is pressed with its locking recesses 10 into the receptacle ring 13 by means of the restoring spring 19. Should it be positioned such after a turning of the threaded ring 5 that the locking members 9 are not aligned with the locking recesses 10, then the locking ring 12 is positioned on the receptacle ring 13. If the drilling chuck is now accelerated in the tangential impact screw operation or in the tangential impact drill operation, a torque will act which displaces the threaded ring 5 with respect to the chuck body 2 and thus, with respect to the locking sleeve 8. However, this displacement only occurs until the locking members 9 are aligned with the locking recesses 10, and the locking ring 12 is moved into the engaged position by the force of the restoring spring 19. In the engaged position, the relative rotation of the threaded ring 5 with respect to the chuck body 2 is then prevented both in the direction of rotation corresponding to the release of the drilling chuck and in the direction of rotation corresponding to the retensioning of the drilling chuck.

The restoring spring 19, which carries out the restoring force on the locking sleeve 8, is supported axially rearwards on a sleeve part 20 fixed with respect to the chuck body. This sleeve part is preferably press-molded with the chuck body 2, wherein the chuck body has a fine toothing 32 for this purpose (FIG. 4), which burrows into the material of the sleeve part 20 that is to be press-molded so that both components are fixedly connected with one another. On its side facing away from the impact drilling spindle 1, the sleeve part 20 has a guide collar 33 on which an end section 34 of the clamping sleeve 11 is guided.

Figure 3:
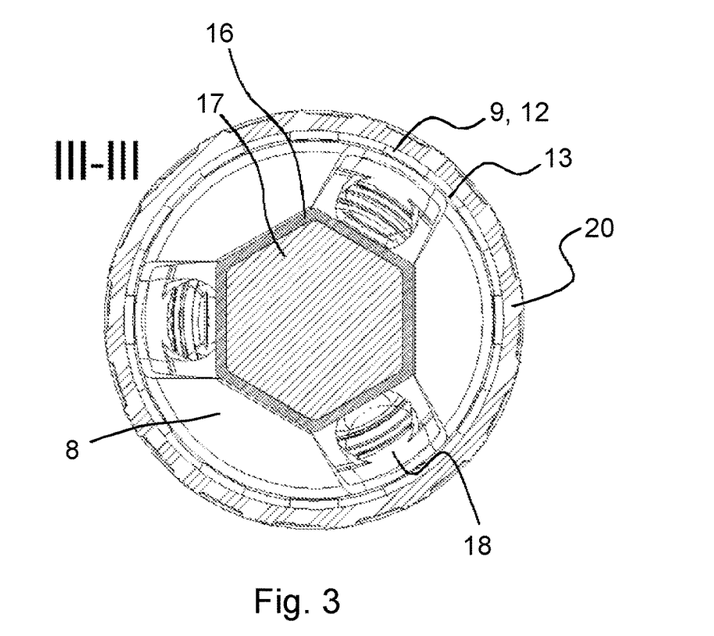
FIG. 3 illustrates the section III-III from FIG. 1.

In order to be able to form the drilling chuck in a compact manner, the locking sleeve 8 has passages 18 for the clamping jaws 6, which can in particular be derived from FIG. 3. There, it can also be seen that the locking sleeve 8 comprises a guide portion 16 having a non-circular cross-section, which is guided on a non-circular chuck body section 17 of the chuck body 2 corresponding thereto. In the present case, the guide portion 16 and the chuck body section 17 are designed as hexagons so that the locking sleeve 8 can be axially displaced with respect to the chuck body 2, but is mounted non-rotatably with respect to the chuck body 2.

Figure 4:
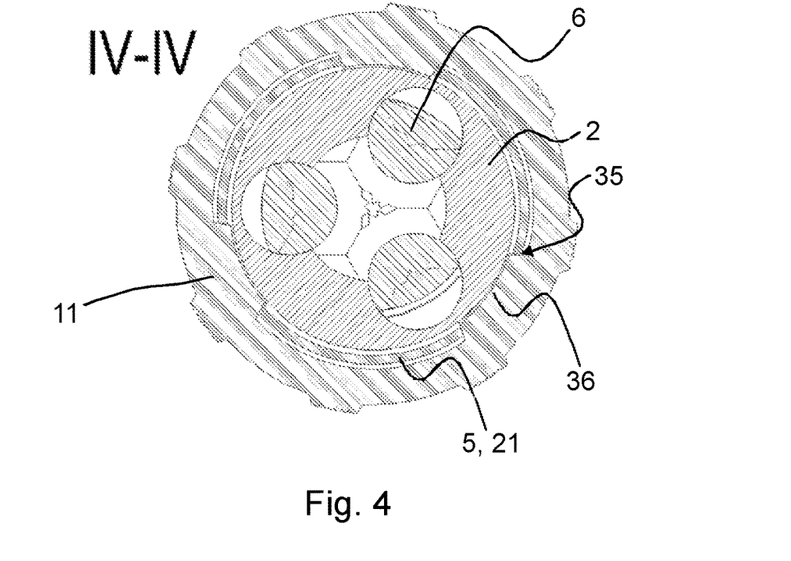
FIG. 4 illustrates the section IV-IV from FIG. 2.

As is apparent from FIGS. 4 and 5, the threaded ring 5, in particular the driver sleeve 21, has at least one rotary member receptacle 35, in the present case exactly three of the rotary member receptacles 35, in which at least one of the rotary members 36 assigned to the clamping sleeve 11 can be accommodated. In the present case, the number of rotary member receptacles 35 corresponds to the number of rotary members 36. The rotary members 36 are—at least in the release configuration—received in the rotary member receptacle 35 of the threaded ring 5, wherein a turning of the clamping sleeve 11 and thus of the rotary member 36 leads to an entrainment of the threaded ring 5 or the driver sleeve 21.

The mode of operation of the drilling chuck according to the invention is again described below: In order to be able to tension a drilling or screwing tool in the tool holder, the user is required to displace the clamping sleeve 11 against the spring force of the restoring spring 19 in the direction of the impact drilling spindle 1. With its support shoulder 15, the clamping sleeve 11 entrains the support section 14 of the locking sleeve 8, and the rotary members 36 engage in the rotary member receptacles 35 of the driver sleeve 21. If, now, the clamping sleeve 11 is turned with respect to the chuck body 2 in the rotational direction of the clamping, the tool holder formed by the clamping jaws 6 is closed until the clamping jaws 6 rest with their clamping surfaces on the shank of the drilling or screwing tool. The clamping sleeve 11 is then again automatically pushed forward by the spring force of the restoring spring 19. As long as the locking members 9 align with the locking recesses 10, the drilling chuck is automatically moved into the locking configuration. If, however, the locking members 9 do not align with the locking recesses 10, then the locking ring 12 is positioned on the receptacle ring 13. During the tangential impact operation of the drilling chuck, however, a torque is introduced which results in an automatic turning of the locking ring 12 with respect to the receptacle ring 13. If, then (for example, after a short time), the locking members 9 are again aligned with the locking recesses 10, then due to the force acting from the restoring spring 19, the locking members 9 engage in the locking recesses 10. Thus, the locking configuration is automatically set by the drilling chuck according to the invention.

In order to again release the drilling chuck, the clamping sleeve 11 has to again be moved rearwards against the force of the restoring spring 19. In doing so, the locking sleeve 8 is again entrained, as a result of which the locking members 9 move into the disengaged position. The clamping sleeve 11, which is non-rotatably connected to the threaded ring 5 in the release configuration, can then be turned in the direction of rotation corresponding to the release until the drilling or screwing tool is again released.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drilling chuck for operation on an impact drilling spindle that is subjectable to tangential loading, the drilling chuck comprising:
   a chuck body connectable to the impact drilling spindle, the chuck body having jaw guides that run inclined to a chuck axis in which clamping jaws are guided that are adjusted via a threaded ring;
   a clamping sleeve coupled to the threaded ring in a torque-transmitting manner, the clamping sleeve being mounted axially displaceable with respect to the chuck body;
   a locking device that is adjustable between a release configuration that enables a relative rotation of the threaded ring with respect to the chuck body and a locking configuration that obstructs or prevents the relative rotation,
   wherein the locking device is formed from a locking sleeve, which is mounted substantially non-rotating but axially displaceable with respect to the chuck body, the locking sleeve comprises at least one locking member,
   wherein the threaded ring or a part connected thereto is assigned at least one locking recess for receiving the at least one locking member of the locking sleeve, and
   wherein the at least one locking member of the locking sleeve is adjustable via the clamping sleeve between a position corresponding to the locking configuration, in which the at least one locking member is engaged in the at least one locking recess, and a position corresponding to the release configuration, in which the at least one locking member is disengaged from the at least one locking recess.

2. The drilling chuck according to claim 1, wherein the locking device is configured to prevent, in the locking configuration, the relative rotation both in the rotational direction corresponding to the release of the drilling chuck and in the rotational direction corresponding to the retensioning of the drilling chuck.

3. The drilling chuck according to claim 1, wherein the locking sleeve has a locking ring with a plurality of locking members, and wherein the threaded ring is assigned a receptacle ring with a plurality of locking recesses.

4. The drilling chuck according to claim 1, wherein the locking sleeve has a support section, and wherein the clamping sleeve comprises a support shoulder for acting upon the support section in at least the locking configuration.

5. The drilling chuck according to claim 4, wherein the support section is formed on the at least one locking member.

6. The drilling chuck according to claim 1, wherein the locking sleeve comprises a guide portion with a non-circular cross-section, which is guided on a non-circular chuck body section of the chuck body corresponding thereto.

7. The drilling chuck according to claim 1, wherein the locking sleeve comprises passages for the clamping jaws.

8. The drilling chuck according to claim 1, wherein the locking sleeve is acted upon by a restoring spring.

9. The drilling chuck according to claim 8, wherein the restoring spring is supported on an annular collar of the chuck body or on a sleeve part axially fixed with respect to the chuck body.

10. The drilling chuck according to claim 1, wherein the threaded ring is formed of multiple parts from a driver sleeve and a clamping ring, which is in engagement with the clamping jaws, and wherein the at least one locking recess is formed on the driver sleeve, which is non-rotatably connected to the clamping ring.

11. The drilling chuck according to claim 1, wherein the threaded ring has at least one rotary member receptacle and the clamping sleeve has at least one rotary member, the least one rotary member being accommodated within the at least one rotary member receptacle.

* * * * *